United States Patent Office 3,542,638
Patented Nov. 24, 1970

3,542,638
ACOUSTICAL SURFACE COVERING
Joseph A. Kenny, Greenwich, Conn., assignor to GAF Corporation, a corporation of Delaware
Filed May 7, 1968, Ser. No. 727,250
Int. Cl. B32b 5/18; G10k 11/04
U.S. Cl. 161—159                                9 Claims

ABSTRACT OF THE DISCLOSURE

A surface covering having acoustic damping characteristics composed of a felt facing attached to a foam backing material.

SPECIFICATION

Figure 1:
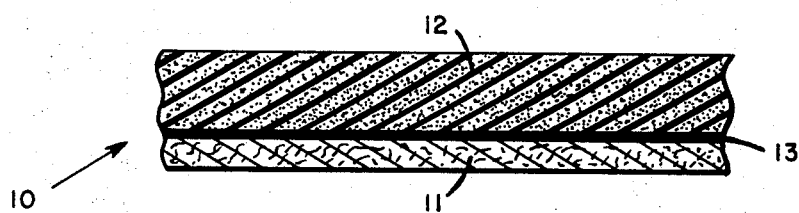

The present invention relates to wall coverings and particularly to acoustic wall coverings.

Wool and synthetic fiber felt materials have been utilized as sound absorbing materials in wall coverings or as thick pads under or inside the housings of noise producing machines, such as typewriter pads, electric motor housings, pads glued to the inside walls of electronic computer casings or communications equipment and other structures. The sound absorbing capacity of a felt material is expressed in terms of its sound absorption coefficient (percent sound absorption) as a function of frequency. The practical, measurable quantity is the random-incidence absorption coefficient measured by what is known as the reverberation room method. The Noise Reduction Coefficient (NRC) rating of a felt material is calculated by averaging arithmetically the sound absorption coefficients from 250 c.p.s. to 2,000 c.p.s. at octave intervals. The absorbing capacities of felt materials are functions of thickness, weight per unit of area, and air flow resistance. A specific thin felt material with the proper weight, thickness and air flow resistance for the best sound absorption will characteristically show high absorption at the high frequencies (2,000 c.p.s. and above) and characteristically low absorption at the low frequencies (250 c.p.s. to 2,000 c.p.s.). As a result of this characteristic, a typical thin felt material has a low NRC rating of about 0.1 to 0.3, depending on the thickness, since the NRC rating average is calculated largely from the low and medium frequency coefficients rather than from the high frequency coefficients.

One of the objects of the present invention is to provide a thin acoustic wall covering having an NRC rating that will effectively absorb sound vibrations.

Another object of the invention is to provide an acoustic wall covering that can be applied to walls with facility.

Still a further object of the invention is to provide an acoustic wall covering that is flexible and easily handled.

Still another object of the invention is to provide an acoustic wall covering that will be substantially thin and still possess a desired NRC rating at frequencies embracing the usual noise levels desired to be absorbed.

In one aspect of the invention, a backing sheet of foamed material may be attached to a felt made from natural or synthetic fibers by a suitable septum or film, such as a layer of adhesive or the like.

In another aspect of the invention, the foam may be of the flexible rubber or flexible plastic type such as neoprene rubber, polyurethane, or polyvinyl chloride foam, and it may be attached to the felt facing by a layer of rubber, such as rubber latex, solvent base rubber or resin adhesives.

In still another aspect of the invention, the foam rubber or plastic may be of such thickness that the resulting covering will have an average NRC rating of substantially 0.40.

Other objects, advantages, and features of the invention will become apparent from the following description and drawing which is merely exemplary.

Figure 2:
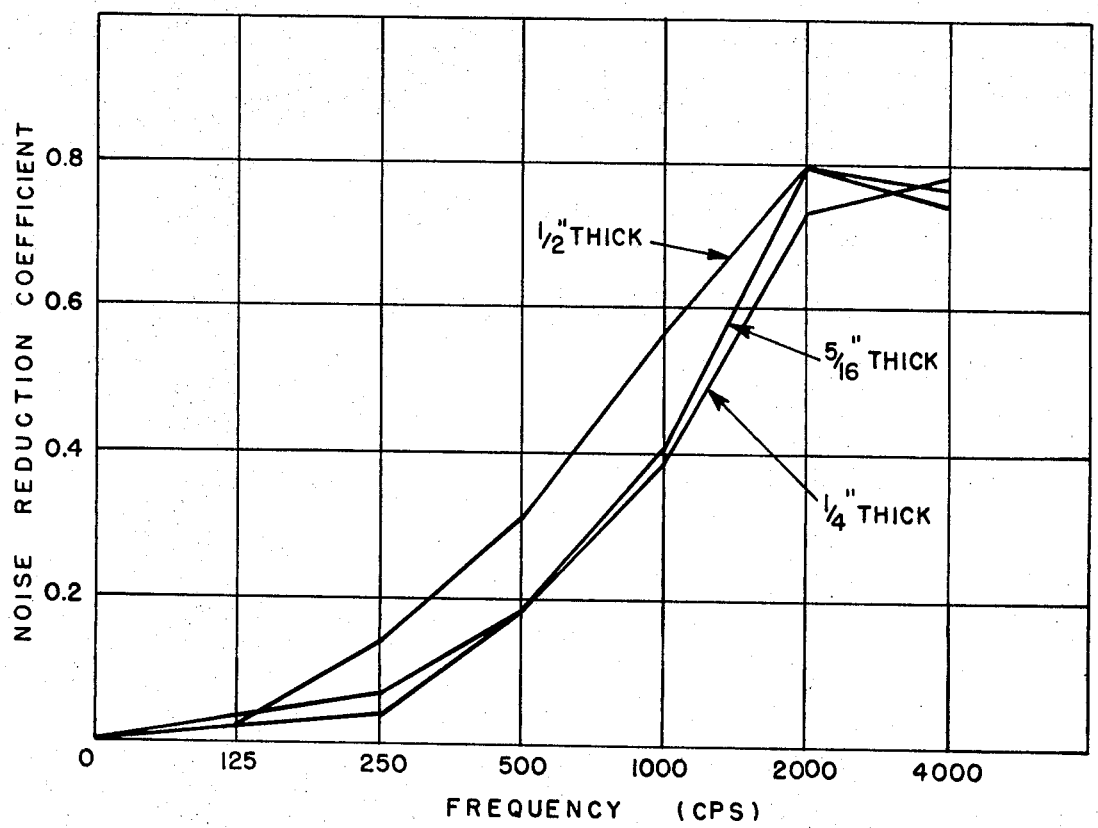

In the drawing:

FIG. 1 is a sectional view of an acoustic wall covering to which the principles of the invention have been applied; and FIG. 2 is curves showing the variation of the noise reduction coefficient with increasing sound frequency.

Referring to the drawing, and particularly to FIG. 1, the principles of the invention are shown as applied to an acoustic wall covering 10, including a relatively thin layer of felt 11, which may be made from natural or synthetic fibers. To the back of the felt 11, there is provided a layer of quiescent air entrapping material, in the form of foamed material 12. The foamed material may be securely bonded to the layer of felt 11, by a suitable film of adhesive 13, such as provided by a rubber latex, solvent base rubber or resin adhesive. Preferably, the layer of foam material is polyvinyl chloride or neoprene rubber foam which is fire resistant and which will meet fire code requirements. Other types of foamed material may be used, such as polyurethane foam of substantially the same thickness, density and open cellular structure, which would not be completely fire resistant. By treating polyurethane foamed material with a fire resistant resin, which will be unaffected in the joining of the foam to the felt with the adhesive, it is possible to fusion laminate it or attach it adhesively by partial melting to the felt without affecting the fireproof characteristics of the foamed material.

The quiescent air entrapping material has the ability to absorb low frequency sound when applied to a solid surface such as a wall. By choosing the proper thickness, $1/8''$ to $1/2''$, of entrapped quiescent air, the desired low frequency sound waves can be converted into friction as they pass through the open cell structure of the foam. Thus, when a relatively thin layer of felt is added to the air entrapping substance, both high and low frequency sounds are effectively absorbed.

Further improvement can be obtained by using a film between the felt and the air entrapping substance to give a "drum-head" effect. Thus, such a film makes the air entrapping substance a resonance absorber in which the lower frequency sound waves are converted to vibrational energy that is absorbed by the felt and the foam. The "drum-head" film may be the rubber based adhesive described above, or a thermoplastic film.

The following polyvinyl chloride foam backed felt sample with a film therebetween was found to have the characteristics listed below:

| Description | Thickness, inches | Density, percent sp. gr. | Air permeability, c.f.m./ sq. ft./ 0.5" H₂O | NRC, rating |
|---|---|---|---|---|
| 3/16" polyvinyl chloride foam with felt facing | .210-.225 | 20.2 | 0.5-1.0 | .40 |

Referring to FIG. 2, it is apparent that the polyvinyl chloride foam attached to the layer of felt produces an NRC rating in the vicinity of about 0.4 over a frequency range between about 250 to 1,000 c.p.s., and that increases and decreases in sound frequency are attended by a substantially directly proportional decrease and increase in sound absorption coefficient, respectively.

The acoustic wall covering of this invention provides a relatively thin, flexible and easily applied wall covering, having superior noise absorbing characteristics. It can be cemented directly to a plaster wall, using any of the standard types of wall paper paste. When applied, it provides certain physical advantages over known coverings having more rigid backing materials. Thus, if a heavy blow is applied to a wall covered with the material of this invention, the material or wall would not be permanently depressed because the foam would quickly return to its original flat surface. The outer face would not retain small nail or tack marks because the foam backing would contract and seal the punctures when the nails were removed.

Although the various features of invention have been shown and described in detail, it will be evident that changes may be made in such details and certain features may be used without others without departing from the principles of the invention.

What is claimed is:

1. An acoustical surface covering comprising a relatively thin layer of felt having opposed faces, and a thicker layer of an open cellular synthetic polymeric foam material adhered to one of said felt faces whereby air may be entrapped in the cellular structure thereof.

2. An acoustical surface covering as in claim 1 and further comprising a film of an adhesive between said layers of felt and foam material to bond said layers together.

3. An acoustical surface covering as in claim 1 with said foam layer being flexible.

4. An acoustical surface covering as in claim 1 with said foam layer being resilient.

5. An acoustical surface covering as in claim 1 with said foam layer being of polyvinyl chloride.

6. An acoustical surface covering as in claim 1 and further comprising a thin vibrational film between said layers of felt and foam material.

7. An acoustical surface covering as in claim 1 with said foam material layer being from 1/8 to 1/2 inch in thickness.

8. An acoustical surface covering as in claim 1 with said felt layer being one of natural and synthetic fibers, said adhesive being rubber latex, said foam material being polyvinyl chloride.

9. An acoustical surface covering as in claim 1 with said foam material being of rubber.

References Cited
UNITED STATES PATENTS

| | | | |
|---|---|---|---|
| 2,694,026 | 11/1954 | Johnson | 161—165 |
| 3,227,603 | 1/1966 | Kraiman | 161—160 |

WILLIAM J. VAN BALEN, Primary Examiner

U.S. Cl. X.R.

161—160, 165; 181—33.1, 33.4